Nov. 19, 1929.   T. B. HUESTIS   1,736,444
METHOD FOR MAKING INSULATED ELECTRICAL CONDUCTORS
Original Filed Aug. 5, 1924
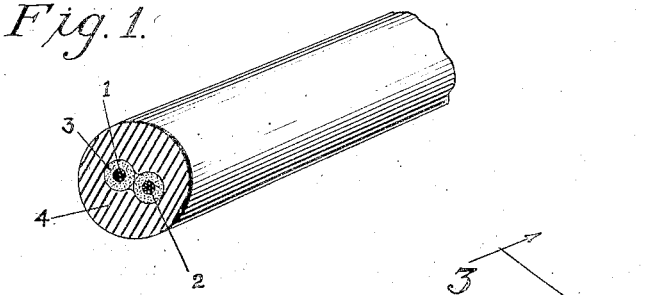
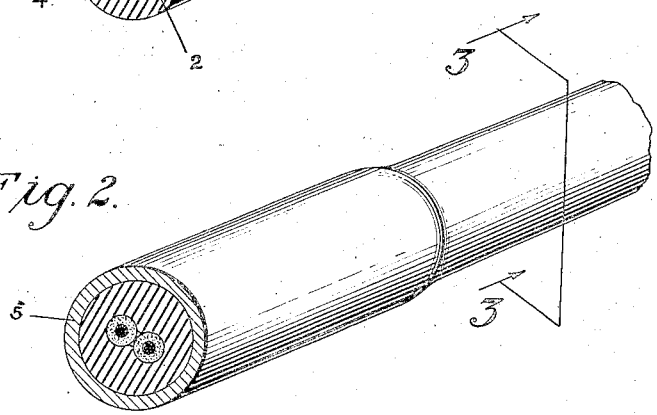
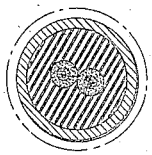
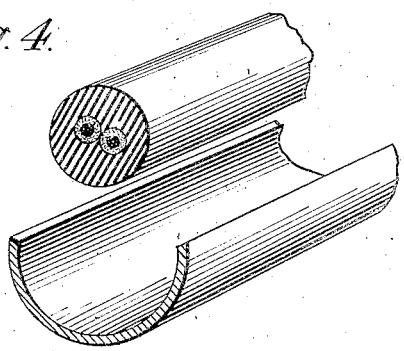
INVENTOR.
Thomas B Huestis
BY
ATTORNEY.

Patented Nov. 19, 1929

1,736,444

UNITED STATES PATENT OFFICE

THOMAS B. HUESTIS, OF BRISTOL, RHODE ISLAND, ASSIGNOR TO NATIONAL INDIA RUBBER COMPANY, OF BRISTOL, RHODE ISLAND, A CORPORATION OF RHODE ISLAND

METHOD FOR MAKING INSULATED ELECTRICAL CONDUCTORS

Original application filed August 5, 1924, Serial No. 730,139. Divided and this application filed March 31, 1926. Serial No. 98,655.

This invention relates to a method for making insulated electrical conductors, more particularly to a method for compacting such conductors when used in finished form either with or without an outer sheath of soft metal.

In the making of various forms of insulated electrical conductors, either single or multiple, these conductors, whether or not provided with a primary covering of insulation, must have an outer or wear covering of insulation, which may or may not be surrounded by a sheath of soft metal. As an example in the making of some forms one or more previously insulated conductors are run through a tubing machine which deposits an outer covering of plastic insulation, such as rubber. The covered conductor may then be cured, while in other cases it is run through a second tubing machine or lead press by which it is given an additional covering or sheath of soft metal such as lead before curing. In some instances the lead sheath may be left as a permanent covering, while in other cases it is used merely during the cure and is then stripped from the conductor. There are a number of objections to conductors made as above described. The insulating material deposited by the tubing machine frequently does not come into intimate contact and union with all parts of the conductors which it surrounds, particularly if they are in twisted form or are covered with woven or other fabric, and it is not dense enough to provide the greatest di-electric strength for the particular material used. When the conductor is to be surrounded by a lead sheathing it is necessary to incline the tubing die of the lead press in the direction in which the conductor passes through it, as otherwise by reason of the great pressure on the lead it would tend to flow backwardly along the conductor and cause the latter to stick. Hence as the lead sheath is not applied in a direction normal to the axis of the conductor it does not fit as closely as is desired. Moreover, the lead sheath as it issues from the die is of a more or less wavy character with variation in its diameter, and when large cables which have been sheathed in this manner are cured, blisters frequently develop in the insulation on account of the loose fit of the sheath. By reason of the manner of forming the final coat of insulation, or both this insulation and the outer metal sheath, the complete conductor not only varies in diameter but is not of a minimum cross-section for the amount of material used in its construction. It is evident that where conductors are strung in conduits it is particularly desirable to have them of a minimum cross-sectional area in order that the greatest number of conductors may be accommodated in the conduit.

An object of my invention is to provide a method by which more dense and perfect insulation may be disposed on electrical conductors and more perfectly united to them.

Another object is to provide a method by which the cross-sectional area of an insulated conductor of given capacity and variety may be reduced to a minimum.

Still another object is to provide a method by which the formation of blisters in vulcanizable insulation during the curing process may be prevented.

The invention consists broadly in closely compacting the outer insulating covering of an electrical conductor, whether surrounded or not in final form by a soft metal sheath, by exerting a relatively heavy pressure normally and radially of the conductor.

For a detailed disclosure of the nature and objects of the invention reference is had to the accompanying drawings, in which latter—

Figure 1 is a perspective view of an insulated conductor.

Figure 2 is a similar perspective showing the insulated conductor before and after compressing.

Figure 3 is a section on line 3—3 of Figure 2.

Figure 4 is a perspective of the finished product with lead sheathing removed.

The particular type of insulated electrical conductor shown in the drawings is a multiple one having the conductors 1 and 2 surrounded by insulation 3. The insulated conductors are twisted together and provided with an outer covering 4 of plastic insulation by passage through a tubing machine. The covering 4 is in turn surrounded by a sheath 5 of soft metal such as lead which may be deposited by means of a tubing machine or lead press. As shown in Figures 1 and 2, the covering 4 of plastic insulation, which may be a rubber compound containing sulphur, does not fit closely as ordinarily made around the twisted insulated conductors, an open space occurring between them. The lead tubing also has a loose fit around the plastic insulation in ordinary processes of manufacture.

To remedy this condition I have provided a method of compacting the insulated conductor thus formed whereby there is produced a product consisting of dense close-fitting layers of material. An example of a suitable apparatus for carrying on this invention is shown and described in my copending application, Serial No. 730,139, filed August 5, 1924, of which this application is a division and reference may be had to that application for a description of the apparatus. A suitable apparatus comprises a plurality of hammers so mounted that they can be driven with considerable force in a series of blows against the passing conductor. The striking faces of the hammers are concave in shape and they operate to compress substantially a complete circumference of the conductor at one time. The resulting compressed conductor retains its cylindrical shape.

Figure 2 shows a conductor a portion of the length of which has been passed through the compacting apparatus.

In carrying out the method the conductor which has been previously surrounded with its outer coating of insulation, as by a tubing machine, is run through a lead tuber or press by which it is provided with an outer sheath of lead, and is then ready for the compacting process. While the conductor may be compacted at any time previous to curing, it is preferred to mount the apparatus for carrying out the present invention adjacent the lead tuber and to run the sheathed conductor directly from the tuber into the compacting apparatus. While the conductor is passed through the compacting device, the concaved faces of the hammers strike a section of the lead sheathing and compact the conductor to a minimum and uniform diameter. This operation is repeated on successive sections until the entire conductor is compacted. The compacted insulated conductor is then preferably subjected to vulcanization whereby the strength of the rubber insulation is increased. If desired, the lead sheath may be retained around the conductor when it is put into use or it may be removed as shown in Figure 4. By the old method it is impossible to get a uniformly tight fit of the lead sheathing on the conductor, notwithstanding careful adjustment and the employment of expert operators, but by the use of my method the lead tubing operation need not be performed with such great care and skill, and at the same time the finished conductor is provided with a dense, hard tight-fitting lead sheath of uniform diameter and minimum cross-section as shown in Figure 3 with a consequent saving of lead. At the same time, as shown in Figures 3 and 4, the insulation beneath the lead sheathing is also compacted and rendered dense so that its di-electic strength is increased, it is more firmly and perfectly united to the conductor or conductors, and in the case of multiple conductor cables a considerably more compact construction is obtained. By the use of the invention, the formation of blisters in the curing of conductors insulated with vulcanizable material is also avoided. In the case of conductors in which the lead sheath is stripped off after curing the advantages of uniform diameter, minimum cross-section, smoother surface, non-blistering, increased di-electric strength, and more perfect union with the conductor or conductors are also obtained. While the invention is particularly applicable in the manufacture of conductors having an outer insulating covering of plastic material formed by a tubing operation, it is evident that, irrespective of the nature and manner of applying the insulation by surrounding the conductor with a lead sheath in the manner described and then compacting the sheath the insulating material will at the same time be improved for reasons above stated.

The invention is capable of wide application in the manufacture of many forms of electrical conductors such as submarine, park lighting, fire alarm, and single and multiple conductor power and telephone cables, either where the lead sheath is a permanent part of the conductor or is stripped therefrom after curing. The invention is also of great value in the manufacture of the single or multiple conductor, flexible cables now so widely used in the arts in connection with portable electrical apparatus, since by its use an outer die formed covering of rubber or other insulation can be produced which is dense, wear resisting, of relatively high di-electric strength, and which is firmly united to the conductor or conductors at all points.

While a specific embodiment of the invention has been disclosed in the present application, it is obvious that it is capable of numerous modifications, and it is not desired to limit it otherwise than as set forth in the appended claims.

Having thus described my invention what I claim and desire to protect by Letters Patent is:

1. The method of forming a rubber insulated cable which comprises extruding rubber insulation about an assembly of conductors, extruding lead over the insulation, intermittently applying to successive portions of the cable a normal force simultaneously applied to all points in a circumference of the cable, and curing.

2. The method of forming a rubber insulated cable which comprises extruding rubber insulation about an assembly of conductors, extruding lead over the insulation, intermittently applying to successive portions of the cable a normal force simultaneously applied to all points in a circumference of the cable, curing, and stripping the lead sheath from the cable.

Signed at Bristol, county of Bristol, and State of Rhode Island, this 19th day of March, 1926.

THOMAS B. HUESTIS.